United States Patent
Courtney et al.

(10) Patent No.: US 8,627,108 B2
(45) Date of Patent: *Jan. 7, 2014

(54) SYSTEM AND METHOD FOR PROTECTING DATA ON A MOBILE DEVICE

(75) Inventors: Sean Alexander Courtney, Hamilton (CA); Neil Patrick Adams, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,062

(22) Filed: Sep. 14, 2012

(65) Prior Publication Data

US 2013/0013933 A1 Jan. 10, 2013

Related U.S. Application Data (63) Continuation of application No. 12/694,541, filed on Jan. 27, 2010, now Pat. No. 8,296,580.

(51) Int. Cl.
*H04L 9/32* (2006.01)
*H04L 9/00* (2006.01)
*H04K 1/00* (2006.01)

(52) U.S. Cl.
USPC .............. 713/189; 713/193; 380/270; 380/44

(58) Field of Classification Search
USPC ........... 380/270, 277–279, 281, 284, 286, 44; 713/189, 193–194; 726/26
See application file for complete search history.

(56) References Cited

U.S. PATENT DOCUMENTS

| | | | | |
|---|---|---|---|---|
| 7,054,613 B2 * | 5/2006 | Smeets | | 455/410 |
| 7,904,709 B2 * | 3/2011 | Bajar et al. | | 713/150 |
| 8,078,869 B2 * | 12/2011 | Adams et al. | | 713/166 |
| 8,209,744 B2 * | 6/2012 | Zhu et al. | | 726/5 |
| 8,229,118 B2 * | 7/2012 | Rose et al. | | 380/247 |
| 8,296,580 B2 * | 10/2012 | Adams et al. | | 713/189 |
| 2007/0297610 A1 | 12/2007 | Chen et al. | | |

FOREIGN PATENT DOCUMENTS

| | | |
|---|---|---|
| EP | 2043396 A1 | 4/2009 |
| JP | 08-272742 A | 10/1996 |
| JP | 1501330 A2 | 1/2005 |
| WO | WO 00/45243 A1 | 8/2000 |

OTHER PUBLICATIONS

Enforcing encryption of internal and external file systems on BlackBerry devices; Techical Overview; 2008; Research in Motion Limited; Available from http://docs.blackberry.com/en/admin/deliverables/3940/file_encryption_STO.pdf.

Sandhu, Ravi.; "Flexible Multi-Factor Authentication in an Uncertain World"; ERCIM News, No. 63, Special: Security and Trust Management; Oct. 2005; Available from http://www.ercim.eu/publication/Ercim_News/enw63/sandhu.html.

(Continued)

*Primary Examiner* — Hosuk Song (74) *Attorney, Agent, or Firm* — Brett J. Slaney; Blake, Cassels & Graydon LLP (57) ABSTRACT

Methods and systems are disclosed for protecting data on a mobile device. A data protection module on the mobile device receives a transmission including a secret key. The secret key is used in encrypting data on the device and is then deleted. Subsequent to an event detectable to the mobile device, the data protection module receives another transmission including said secret key. The secret key is then used to decrypt the encrypted data.

21 Claims, 8 Drawing Sheets

(56) References Cited

OTHER PUBLICATIONS

GuardianEdge Products Overview, Enterprise-class protection for critical mobile data; available from www.guardianedge.com/products; Accessed Nov. 6, 2009.
Data Protection Platform; Guardian Edge Datasheet—accessed from GuardianEdge Products page Nov. 6, 2009.
Device Control; Guardian Edge Datasheet—accessed from GuardianEdge Products page Nov. 6, 2009.
Device Control Auditor; Guardian Edge Datasheet—accessed from GuardianEdge Products page Nov. 6, 2009.
Smartphone Protection; Guardian Edge Datasheet—accessed from GuardianEdge Products page Nov. 6, 2009.
Hard Disk Encryption; Guardian Edge Datasheet—accessed from GuardianEdge Products page Nov. 6, 2009.
Removable Storage Encrption; Guardian Edge Datasheet—accessed from GuardianEdge Productspage Nov. 6, 2009.
Advance Authentication; Guardian Edge Datasheet—accessed from GuardianEdge Products page Nov. 6, 2009.
Altris® Connector; Guardian Edge Datasheet—accessed from GuardianEdge Products page Nov. 6, 2009.
Horn, Marc-Philipp; Search Report from corresponding European Application No. 10151821.5; search completed Aug. 5, 2010.

* cited by examiner

SYSTEM AND METHOD FOR PROTECTING DATA ON A MOBILE DEVICE

CROSS-REFERENCE TO RELATED APPLICATIONS

The present application is a continuation of U.S. patent application Ser. No. 12/694,541 filed on Jan. 27, 2010 incorporated herein by reference.

TECHNICAL FIELD

The following relates generally to protecting sensitive information stored on a mobile device.

BACKGROUND

As mobile devices become more prevalent, it has become increasingly important to protect sensitive information stored on these devices. Many mobile devices can be configured to operate in a locked mode in which most or all of the applications and data on the mobile device are inaccessible through the user interface. Typically, a mobile device can be configured to enter locked mode automatically after a designated period of inactivity and/or by a manual prompt from the user. The mobile device can then only be unlocked using a secret password known only to the user.

However, even when a mobile device is locked, the data stored on the device may still be accessible by an interloper by physically extracting the relevant hardware from the device and using a separate computer to retrieve the data stored on the hardware. To address this problem, some mobile devices can be configured to encrypt the data stored on the device, so that even if the interloper is able to retrieve the data from the locked mobile device, the interloper will not be able to decrypt the data.

In such applications, the data on the device is typically encrypted using a content protection key. For example, the content protection key can be a symmetric key stored on the device and used to encrypt and decrypt data on the device. When the device enters locked mode, a temporary symmetric key is generated from the user's password and is used to encrypt the content protection key. The temporary key is then destroyed. Therefore, an interloper is unable to decrypt encrypted data extracted from the device unless the interloper can first decrypt the content protection key. However, decrypting the content protection key requires the temporary symmetric key, which is directly derived from the user's password and can therefore only be created by the user supplying his password.

On some mobile devices, an asymmetric private/public key pair is used to protect data received by the mobile device while the mobile device is locked. Specifically, a public key is used to encrypt the received data, which can be subsequently decrypted using the corresponding private key. In mobile devices having this functionality, the private key is also encrypted using the temporary symmetric key generated from the user's password, thereby also preventing an interloper from decrypting the received data encrypted using the public key.

The security of the above techniques depends on the secrecy of the user's password. If the user divulges the password to the interloper (by force or by accident), or if the user is forced by the interloper to input his password, the interloper will be able to access the sensitive information on the device, even if it is encrypted using the techniques explained above.

It is desired to provide enhanced protection of sensitive information stored on a mobile device.

BRIEF DESCRIPTION

Representative embodiments will now be described by way of example only with reference to the accompanying drawings, in which.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art and having the benefit of the present disclosure that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

As will be explained in detail below, in one embodiment, the mobile device includes a data protection module to receive a transmission including a secret key and utilize the secret key in encrypting data on the device. In an exemplary implementation of this embodiment, the secret key is transmitted from a trusted party to the mobile device in a secure transmission. After the secret key is used in encrypting the data, it is deleted by the data protection module. The secret key is unknown to the user, and in this way, the encrypted data cannot be decrypted, even using secret information possessed by the user, such as the user's password. Subsequent to an event detectable to the mobile device, for example, after a specified period of time or after an event that indicates that the mobile device is in an area safe from interlopers, the secret key is again received by the mobile device and is used in decrypting the encrypted data.

Advantageously, in another embodiment, the secret key is combined with secret information provided by the user (e.g. the user's secret password) to form a new key, which is used in encrypting the data on the device. The secret key may instead be combined with a pre-existing data string stored on the device to form the new key. Once the data is encrypted, the new key and the secret key are both deleted. Afterwards, once the mobile device is in an area safe from interlopers, the secret key is again received by the mobile device. The secret password provided by the user (or alternatively the pre-existing string stored on the device) is again combined with the secret key to derive the new key, which is then used to decrypt the data on the device.

The data may be one or more content protection key(s) used in encrypting and decrypting sensitive information on the device, or may be the sensitive information itself.

As will also be explained in more detail below, in another embodiment, the secret key is an asymmetric private key, and therefore the data protection module instead uses the corresponding public key to encrypt the data. Then, subsequent to the event detectable to the mobile device, for example, once the mobile device is in an area safe from interlopers, the asymmetric private key is transmitted to the data protection module and is used to decrypt the encrypted data. Advantageously, the public key may be combined with secret information provided by a user, or by a pre-existing data string stored on the device, to form a new public key, in which case the corresponding private key would need to be similarly modified by the data protection module to correspond to the new public key.

Embodiments will now be described with reference to the figures. In the following embodiments, the mobile device is considered to be a two-way communication device with advanced data communication capabilities including the capability to communicate with other mobile devices or computer systems through a network of transceiver stations. Examples of applicable mobile devices include pagers, cellular phones, cellular smart-phones, wireless organizers, personal digital assistants, computers, laptops, handheld wireless communication devices, wirelessly enabled notebook computers and the like.

Figure 1:
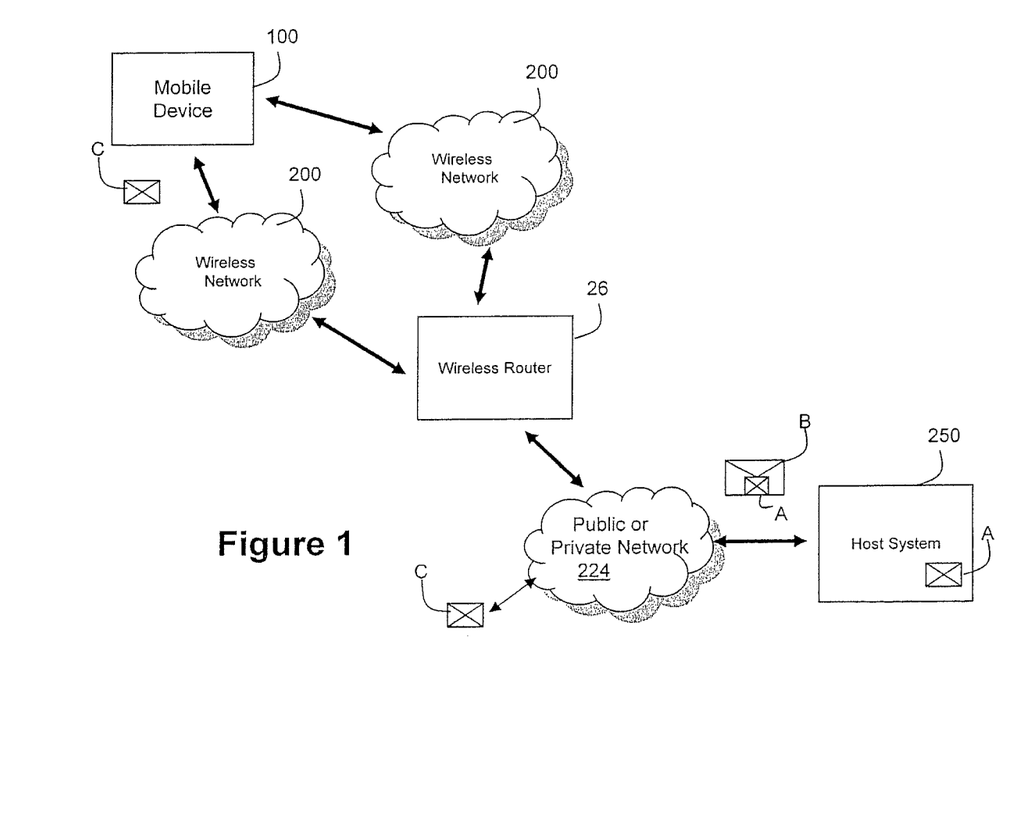
FIG. 1 is a system diagram illustrating the environment in which data items are pushed from a host system to a mobile device.

FIG. 1 is an example system diagram showing the redirection of user data items (such as message A or C) from a corporate enterprise computer system (host system) 250 to a mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer within the host system 250, to any number of server computers in the corporate network (e.g. LAN), which may, in general, include a database server, a calendar server, an E-mail server or a voice-mail server.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. Examples of wireless networks protocols for communicating between mobile device 100 and wireless router 26 include: (1) Code Division Multiple Access (CDMA), (2) the Groupe Special Mobile or the Global System for Mobile Communications (GSM) and the General Packet Radio Service (GPRS), and (3) the upcoming third-generation (3G) and fourth generation (4G) network protocols like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 2:
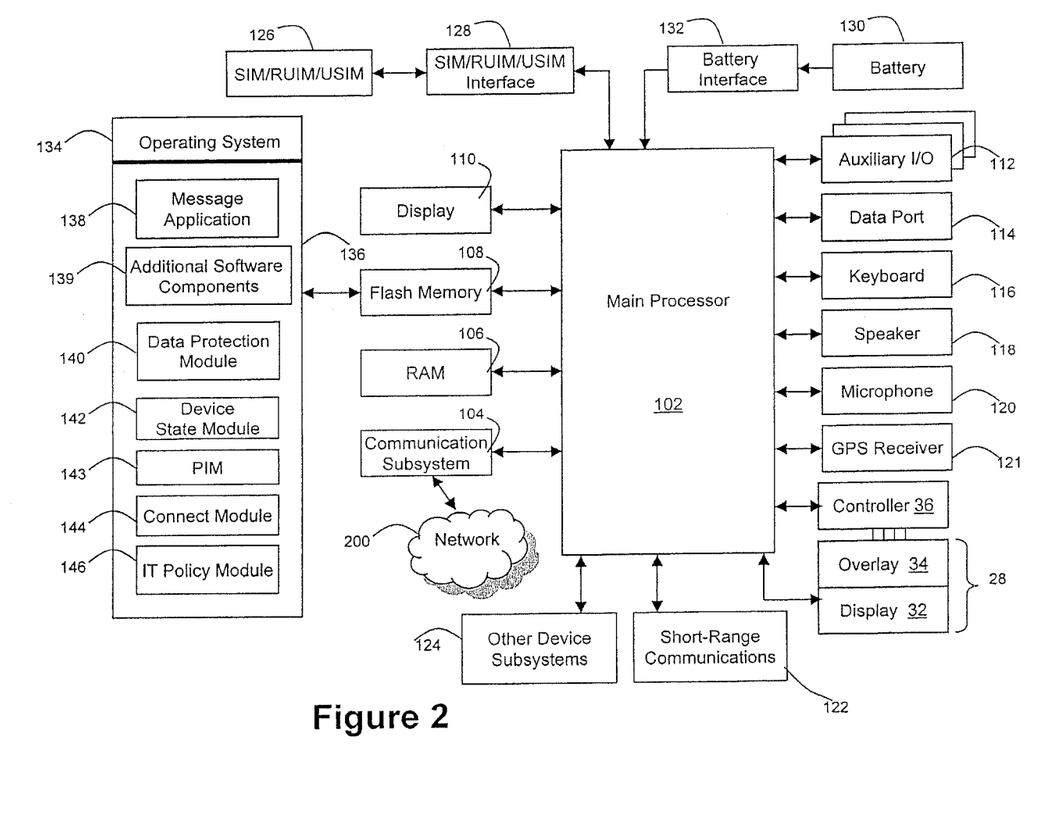
FIG. 2 is a block diagram of an exemplary embodiment of a mobile device.

Referring next to FIG. 2, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to each wireless network 200. Each wireless link connecting the communication subsystem 104 with each wireless network 200 represents one or more different Radio Frequency (RF) channels, operating according to defined protocols specified for the particular network.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over a network 200, and device-resident functions such as a calculator or task list.

The mobile device 100 can send and receive communication signals over a wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) or a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the associated wireless network 200. Once the SIM/RUIM/USIM 126 is inserted into the SIM/RUIM/USIM interface 128, it is coupled to the main processor 102.

The mobile device 100 is a battery-powered device and therefore includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100.

The mobile device 100 also includes an operating system 134 and software components, such as 136 to 146, which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 142, a Personal Information Manager (PIM) 143, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 142 provides persistence, i.e. the device state module 142 ensures that important device data is stored in persistent memory, such as the flash memory 108, so that the data is not lost when the mobile device 100 is turned off or loses power. A PIM 143 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications or third party applications, which are added after the manufacture of the mobile device 100. Examples of third party applications include games, calculators, utilities, etc.

The additional applications 139 can be loaded onto the mobile device 100 through at least one of a wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use the touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over a wireless network 200 through the communication subsystem 104.

The subset of software applications 136 also includes a data protection unit or Data Protection Module 140. As explained earlier, in one embodiment, the Data Protection Module 140 is configured to receive a secret key, for example, from a trusted party remote from the mobile device 100, and use this secret key in encrypting data on the device 100. The secret key is preferably transmitted from the trusted party to the mobile device 100 in a secure transmission, for example, using encryption over the wireless channel 200. However, in other embodiments, such as in embodiments in which the communication link cannot be secured using encryption, it is contemplated that the secret key can instead be sent as part of a message in plaintext, preferably using methods of hiding the key in the message, such as by spreading the key over a plurality of bytes that appear unrelated, but that are retrievable by the Data Protection Module 140. Once the secret key is used in encrypting the data, the Data Protection Module 140 deletes the secret key. After an event detectable by the mobile device 100, for example, after a specified period of time or after an event that indicates that the mobile device 100 is in an area safe from interlopers, the secret key is again received by the Data Protection Module 140 and is used in decrypting the data.

In an alternative embodiment, the secret key is an asymmetrical private key having a corresponding public key, and therefore the Data Protection Module 140 instead uses the public key to encrypt the data. Subsequent to the detectable event, the asymmetric private key corresponding to the public key is received by the Data Protection Module 140 and is used to decrypt the encrypted data.

Exemplary embodiments of this functionality will now be explained in more detail with reference to FIGS. 3-8.

Figure 3:
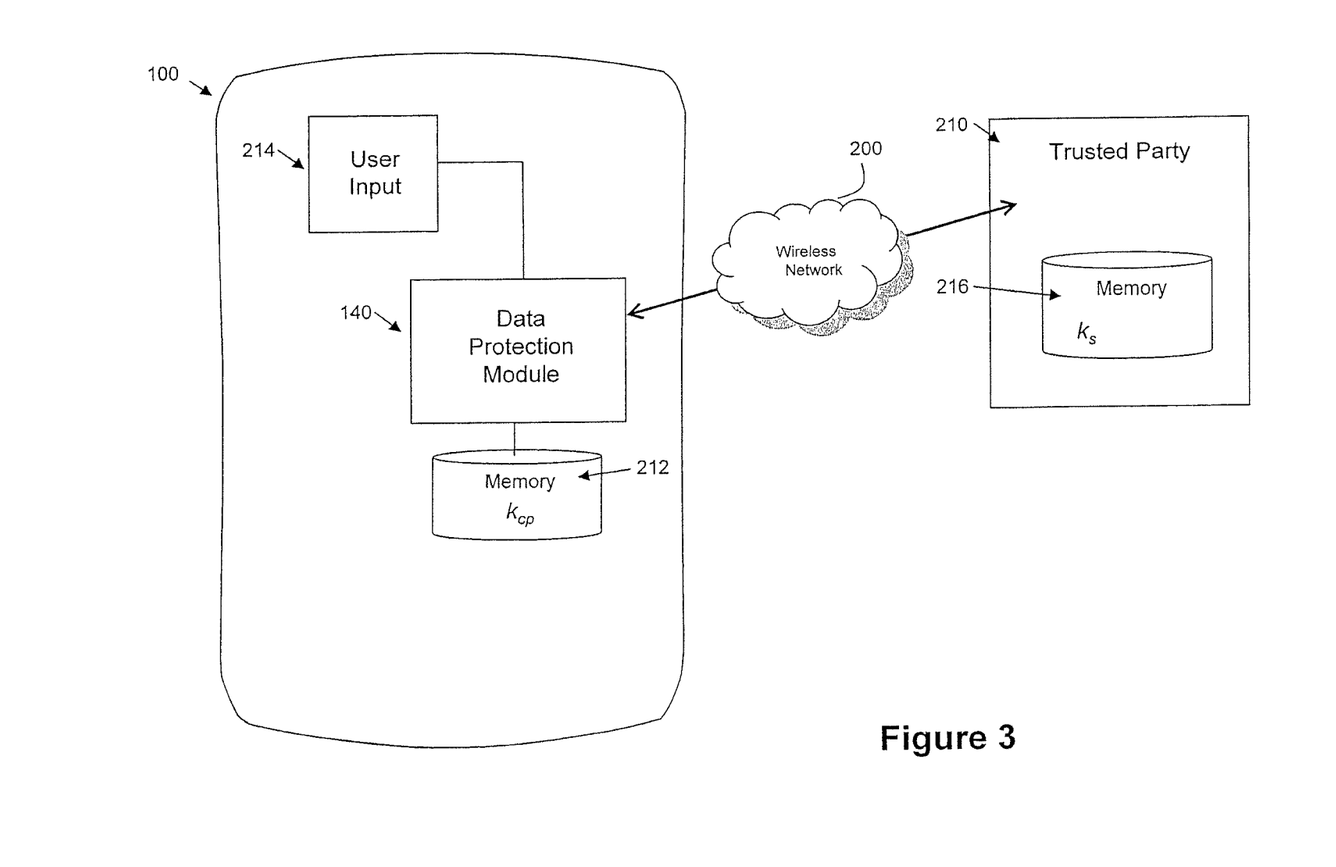
FIG. 3 is a schematic diagram illustrating an embodiment of system components for protecting data on a mobile device.

A first embodiment is described with reference to FIG. 3. As shown in FIG. 3, mobile device 100 includes a Data Protection Module 140, which communicates with a trusted party 210 over the wireless network 200. As will be explained below, in alternative embodiments, it is contemplated that the trusted party 210 can be within host system 250.

The trusted party 210 has stored in its memory 216 a secret key $k_s$. The secret key $k_s$ is private to the trusted party 210. As an example, the secret key $k_s$ may be randomly generated by the trusted party 210 using a random number generator (not shown).

In the embodiment shown in FIG. 3, the mobile device 100 is configured to encrypt and decrypt using a content protection key $k_{cp}$, which is stored in memory 212 on the mobile device 100. The content protection key $k_{cp}$ is a symmetric key used to encrypt and decrypt sensitive information on the mobile device. For example, the content protection key $k_{cp}$ can be a 256 bit AES symmetric key. The Data Protection Module 140 is able to access the content protection key $k_{cp}$, as well as user input 214, for example, in the form of typed data using key board 116.

The mobile device 100 is configured to enter into locked mode by a manual prompt from the user using keyboard 116, automatically after a period of inactivity, by a change in location, or by some other detectable event. As explained earlier, when the mobile device 100 is in locked mode, a user is prevented from accessing most, if not all, of the applications and information on the mobile device 100 through the user interface. For example, the mobile device 100 may prevent access to all applications except the ability to make emergency calls. As another example, during locked mode the mobile device may instead only allow the user to use the smart phone as a "dumb" phone, or limit certain applications, such as date books or other PIM applications.

Once the device 100 is in locked mode, in normal operation it can only be unlocked using secret information provided by the user through a user interface, which is typically a password known only by the user and typed in using keyboard 116.

Figure 4:
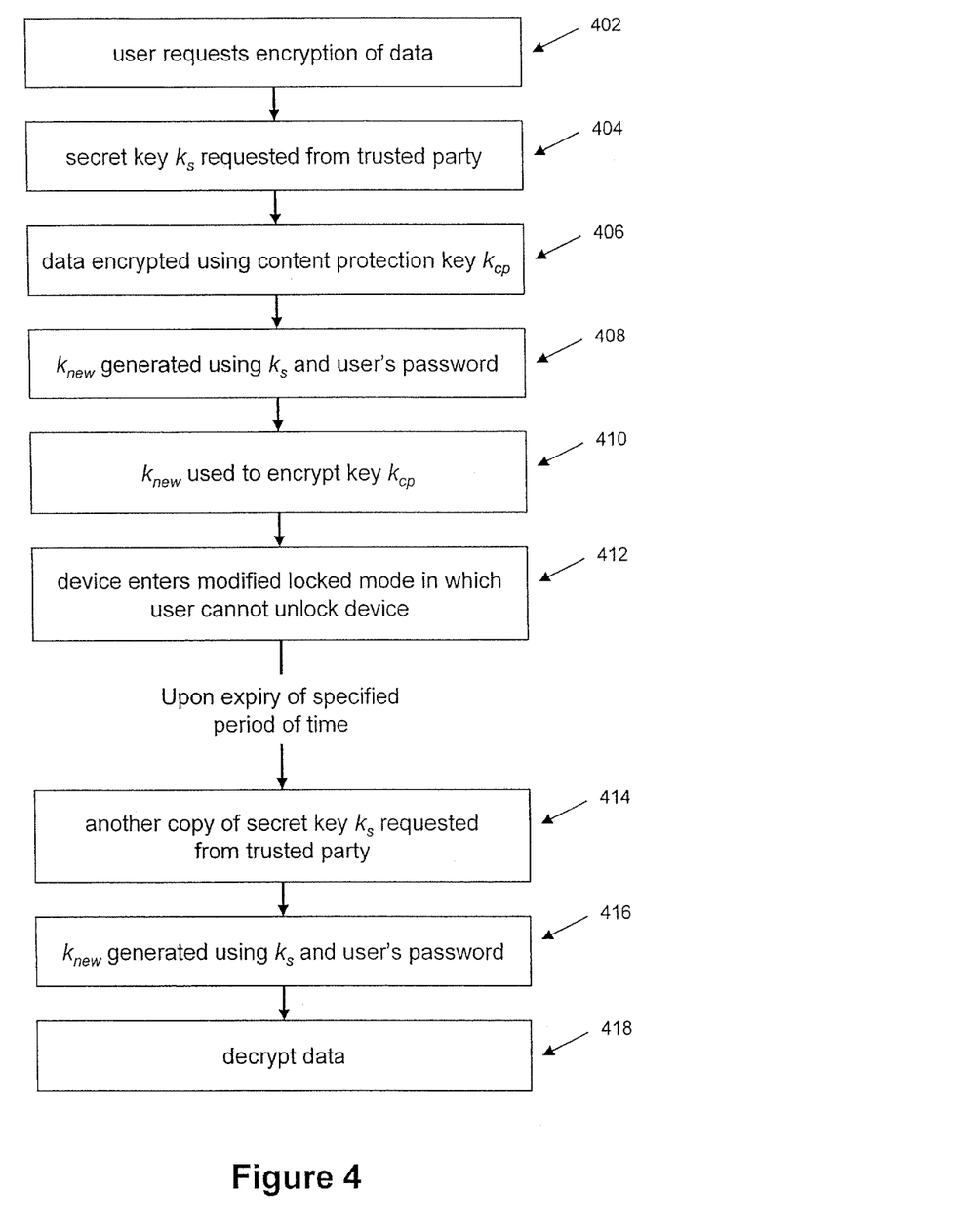
FIG. 4 is a schematic diagram of a set of computer executable instructions for an embodiment of a method of protecting data on a mobile device.

As the user carries the mobile device 100 during his or her travels, the mobile device 100 may be transported into an unsafe area in which there is a risk that an interloper could gain possession of the device 100 and extract from the user the user's password. Therefore, as shown in FIG. 4, the Data Protection Module 140 advantageously provides enhanced protection of data stored on the mobile device 100 by using the secret key $k_s$ from the trusted party 210 in encrypting the data, such that the data cannot be accessed by the interloper, even with knowledge of the user's password.

As explained earlier, all devices exemplified herein that execute operations may include or otherwise have access to computer readable media such as storage media, computer storage media, or data storage devices. Therefore, FIG. 4 can comprise a set of computer readable instructions stored on the mobile device 100 and executed by the Data Protection Module 140.

First, in step 402, the user of the mobile device 100 requests that the Data Protection Module 140 encrypt sensitive information on the device using enhanced protection to ensure that the sensitive information cannot be decrypted by an interloper having knowledge of the user's secret password. The request is made through a user interface via user input 214. As an example, a menu on the display 28 of the mobile device 100 can provide such an option and be selected by the user (not shown). The user also specifies, using keyboard 116, a period of time in which the data is to remain encrypted in this manner. This period of time may equal, for example, the duration of time the mobile device 100 will remain in an area in which an interloper may gain access to the device 100.

Next, in step 404, the Data Protection Module 140 sends a message to the trusted party 210 over wireless network 200 requesting the secret key $k_s$ stored in the memory 216 of the trusted party 210. The trusted party 210 transmits the secret key $k_s$ to the Data Protection Module 140 over wireless network 200 using encryption to ensure the transmission is secure.

In step 406, the Data Protection Module 140 uses the content protection key $k_{cp}$ to encrypt sensitive information on the device.

Next, in step 408, the Data Protection Module 140 combines the secret key $k_s$ with the user's password to derive a new key $k_{new}$. The Data Protection Module 140 can retrieve the user's password by prompting the user to provide the password via the user interface or by accessing the user's password from memory. The user's secret password and the secret key $k_s$ provided by the trusted party 210 are combined by the Data Protection Module 140 to derive the new key $k_{new}$. In an alternative embodiment, it is contemplated that instead, $k_{new}$ can be generated by the Data Protection Module 140 by combining the secret key $k_s$ with a data string stored in memory of the device 100.

In step 410, the Data Protection Module 140 then uses the new key $k_{new}$ to encrypt both the content protection key $k_{cp}$. The new key $k_{new}$ and the secret key $k_s$ are then deleted.

Then, in step 412, the Data Protection Module 140 instructs the device 100 to go into a modified locked mode in which the user cannot unlock the device, even if the user inputs his or her secret password. The modified locked mode may still allow the user to access certain applications on the mobile device 100, for example, the ability to make and receive calls.

Upon the completion of step 412, the device 100 is therefore locked, the sensitive information is encrypted, and the content protection key $k_{cp}$ required to decrypt the sensitive information is encrypted by new key $k_{new}$, which the Data Protection Module 140 has deleted. The user cannot unlock the device 100, and even if an interloper steals or confiscates the device 100 and forces the user to divulge the user's secret password, the user's secret password cannot be used to decrypt content protection key $k_{cp}$. Knowledge of the secret key $k_s$ is required to decrypt content protection key $k_{cp}$, but secret key $k_s$ is only known by the trusted party 210.

The mobile device 100 remains in this mode of operation until the expiry of the period of time indicated by the user in step 402.

Upon the expiry of this period of time, in step 414, the Data Protection Module 140 requests from the trusted party 210 another copy of the secret key $k_s$, which is sent from the trusted party 210 to the Data Protection Module 140 in a secure transmission. In step 416, the Data Protection Module 140 then instructs the mobile device 100 to return to regular locked mode, and the user is prompted to unlock the device 100 by supplying the user's secret password. When the user supplies the user's secret password to unlock the device 100, the secret password and the secret key $k_s$ are then combined to obtain the new key $k_{new}$, and the content protection key $k_{cp}$ is decrypted using the new key $k_{new}$. Alternatively, if the new key $k_{new}$ was created by combining the secret key $k_s$ with a data string from memory, the Data Protection Module 140 again combines the secret key $k_s$ with the data string to obtain $k_{new}$.

Finally, in step 418, the Data Protection Module 140 decrypts the sensitive information stored on the mobile device 100 using decrypted content protection key $k_{cp}$. It is contemplated that in some embodiments the sensitive information remains encrypted subsequent to step 416, and is only decrypted upon a request from the user or from another application operating on the device 100.

As can be seen from the above embodiment, the Data Protection Module 140 can therefore provide enhanced protection of sensitive information stored on the device 100 by using a secret key $k_s$ known only to the trusted party 210 to encrypt the content protection key $k_{cp}$, and then deleting this secret key $k_s$.

In some embodiments, the mobile device 100 may also have stored thereon an asymmetric private/public key pair (k, K) for performing additional data protection. For example, the mobile device may have a public key K used to encrypt sensitive information received when the device is locked, and a corresponding private key k for subsequently decrypting this encrypted information. In such embodiments, the private key k is also encrypted using key $k_{new}$ along with the content protection key $k_{cp}$, and private key k is subsequently decrypted using $k_{new}$ along with the content protection key $k_{cp}$. Additionally, the device may have stored thereon one or more file keys for encrypting and decrypting information on external memory devices on the mobile device 100. In such embodiments, these file keys are also encrypted using key $k_{new}$ along with the content protection key $k_{cp}$, and subsequently decrypted using $k_{new}$ along with the content protection key $k_{cp}$.

Figure 5:
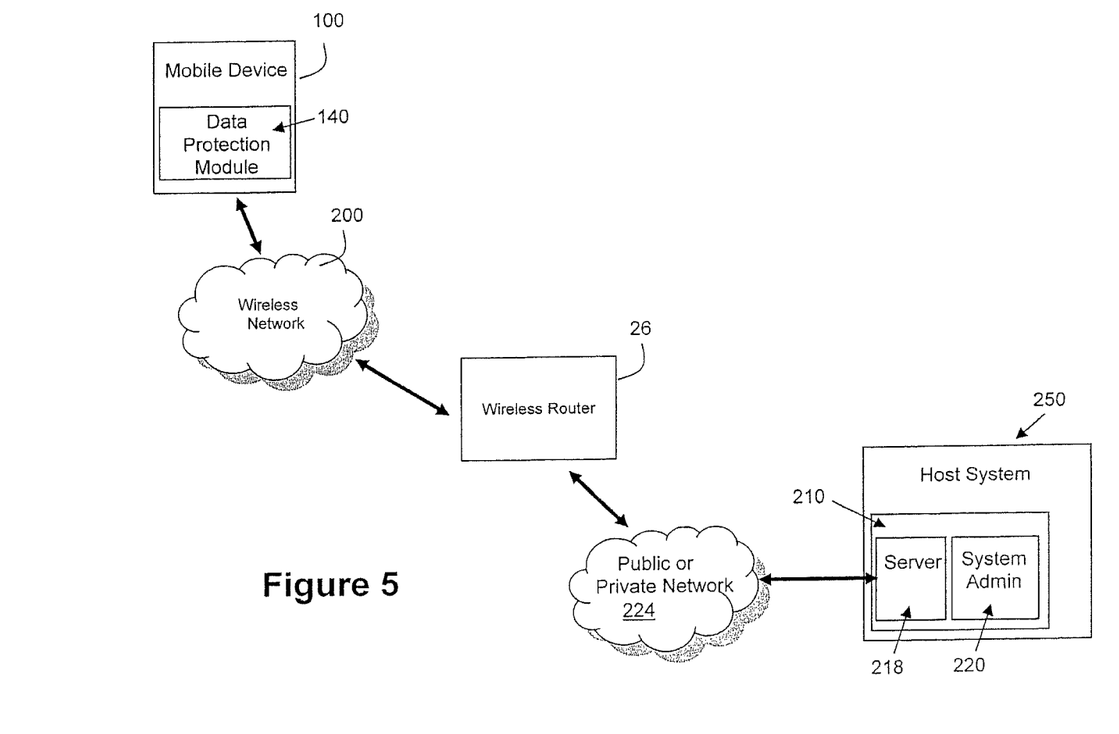
FIG. 5 is a system diagram illustrating an embodiment of system components for protecting data on a mobile device in the environment of FIG. 1.

In one implementation of the embodiment described in FIG. 4, the trusted party 210 is located in the host system 250 of FIG. 1, and the trusted party 210 comprises a server 218 and a system administrator 220. This is shown in FIG. 5. The system administrator 220 interprets messages transmitted from the Data Protection Module 140 and instructs the server 218 to securely transmit the secret key $k_s$ when required. In such a system, it is contemplated that the same server 218, system administrator 220, and (if desired) same secret key $k_s$ could be used to implement the method of FIG. 4 in a plurality of mobile devices in the wireless network 200.

In the embodiments described with reference to FIGS. 3-5, the Data Protection Module 140 initiates the enhanced protection mode in step 402 based on a request from the user at the user interface, and in step 414, the Data Protection Module 140 initiates exiting the enhanced protection mode after the expiry of a specified period of time. The request from the user in step 402 and the expiry of a specified period of time in step 414 are examples of events detectable by the mobile device 100. To this end, it will be appreciated that more generally the Data Protection Module 140 is configured to enter and exit the enhanced protection mode based on events detectable by the device 100. For example, detectable events that may cause the mobile device to initiate step 402 include, but are not limited to: a request from the user via the user interface; a change in location of the mobile device; loss or re-engagement of a near-field communication (NFC) connection, or loss or detection of any particular network, as represented, for example, by a network ID; and/or a request from the trusted party 210. Detectable events that may cause the mobile device to initiate step 414 include, but are not limited to: the expiry of a specified period of time; a change in location of the mobile device; loss or re-engagement of a near-field communication (NFC) connection, or loss or detection of any particular network, as represented, for example, by a network ID; and/or a request from the trusted party 210.

Figure 6:
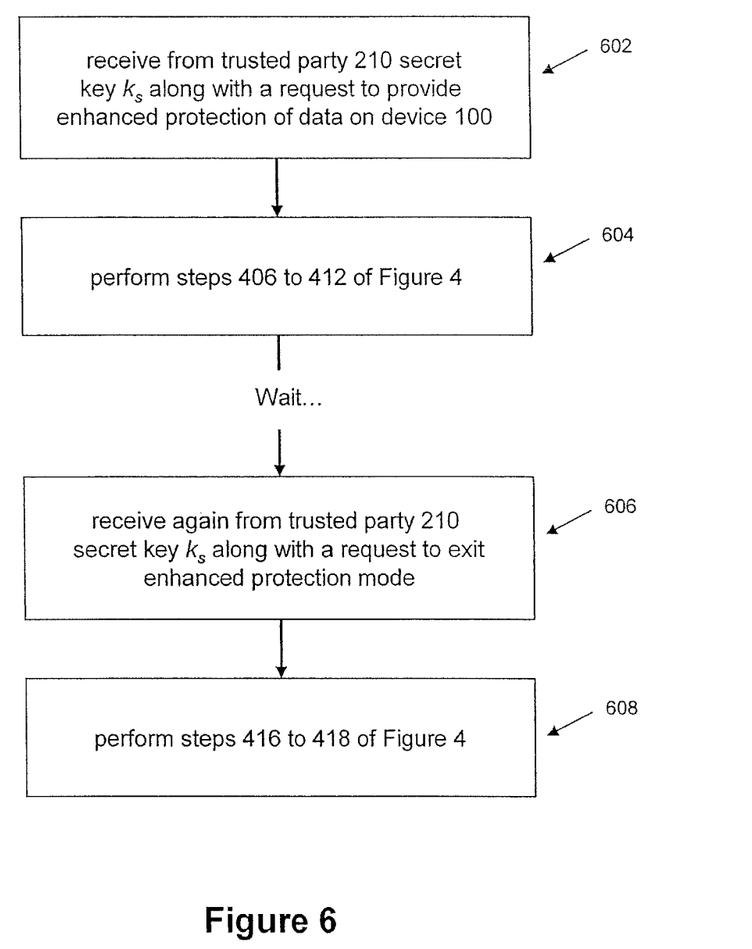
FIG. 6 is a schematic diagram of a set of computer executable instructions for an embodiment of another method of protecting data on a mobile device.

FIG. 6 describes a variant of the embodiment of FIG. 4 in which the trusted party 210 prompts the Data Protection Module 140 to enter and exit the enhanced protection mode.

FIG. 6 can comprise a set of computer readable instructions executed by the Data Protection Module 140 and the trusted party 210.

First, in step 602, upon the occurrence of an event detectable by the trusted party 210, the trusted party 210 sends a secure transmission to the Data Protection Module 140 that includes the secret key $k_s$, as well as a request specifying that the Data Protection Module 140 encrypt sensitive information on the device 100 using enhanced protection. Examples of events detectable by the trusted party 210 include, but are not limited to: the receipt of a message by the trusted party 210 from the mobile device 100 including GPS data indicating that the mobile device 100 has entered an area that the trusted party 210 detects as being unsafe; a request from the Data Protection Module 140 to enter enhanced protection mode; a request from the user of the mobile device 100 to enter enhanced protection mode; and/or a message indicating that the mobile device 100 has lost or detected a particular network.

Upon receiving the secure transmission from the trusted party 210, in step 604, the Data Protection Module 140 executes steps 406 to 412 of FIG. 4.

Upon the completion of step 412, the mobile device 100 is locked, the sensitive information is encrypted, and the content protection key $k_{cp}$ required to decrypt the sensitive information is encrypted by new key $k_{new}$, which the Data Protection Module 140 has deleted. The user cannot unlock the device 100, and even if an interloper steals or confiscates the device 100 and forces the user to divulge the user's secret password, the user's secret password cannot be used to decrypt the content protection key $k_{cp}$. The device 100 remains in this mode and waits for a subsequent message from the trusted party 210.

Upon the occurrence of another event detectable by the trusted party 210, in step 606, the trusted party 210 sends another secure transmission to the Data Protection Module 140 comprising another copy of the secret key $k_s$, as well as a request specifying that the Data Protection Module 140 cease the enhanced protection mode. Examples of such detectable events include, but are not limited to: the expiry of a period of time determined by the by the trusted party 210; the receipt of a message by the trusted party 210 from the mobile device 100 including GPS data indicating that the mobile device 100 has entered an area that the trusted party 210 detects as being safe; a request from the Data Protection Module 140 to exit enhanced protection mode; a message from a user indicating that the mobile device has entered an area that the trusted party 210 detects as being safe; and/or a message indicating that the mobile device 100 has lost or detected a particular network.

Upon receiving the secure transmission from the trusted party 210, in step 608, the Data Protection Module 140 executes steps 416 to 418 of FIG. 4.

In the embodiment described in FIG. 6, the trusted party 210 instructs the Data Protection Module 140 to enter and exit the enhanced protection mode. In one implementation of this embodiment, the trusted party 210 can make this decision by tracking the location of the mobile device 100 using GPS data transmitted to the trusted party 210 from the mobile device 100. The GPS data is indicative of whether or not the device 100 is in a safe area. If the trusted party 210 determines that the mobile device 100 has entered an unsafe area, the trusted party 210 can instruct the Data Protection Module 140 to encrypt its sensitive information using enhanced protection. Once the trusted party 210 determines that the mobile device 100 has returned to a safe area, the trusted party 210 can subsequently instruct the Data Protection Module 140 to exit the enhanced protection mode. In another implementation of this embodiment, the user instead sends a communication to the trusted party 210 specifying when the mobile device 100 is in an unsafe area and when the mobile device 100 has returned to a safe area. The message could be, for example, a call to the trusted party 210.

The embodiments described with reference to FIGS. 3-6 are specific to a mobile device 100 that implements encryption and decryption of sensitive information stored thereon using a content protection key $K_{cp}$. In these embodiments, the user's secret password, or a data string from the memory of the device 100, is combined with the secret key $k_s$ from the trusted party 210 to derive the new key $k_{new}$. It will be appreciated that these embodiments can be generalized as described with reference to FIGS. 7 and 8.

Figure 7:
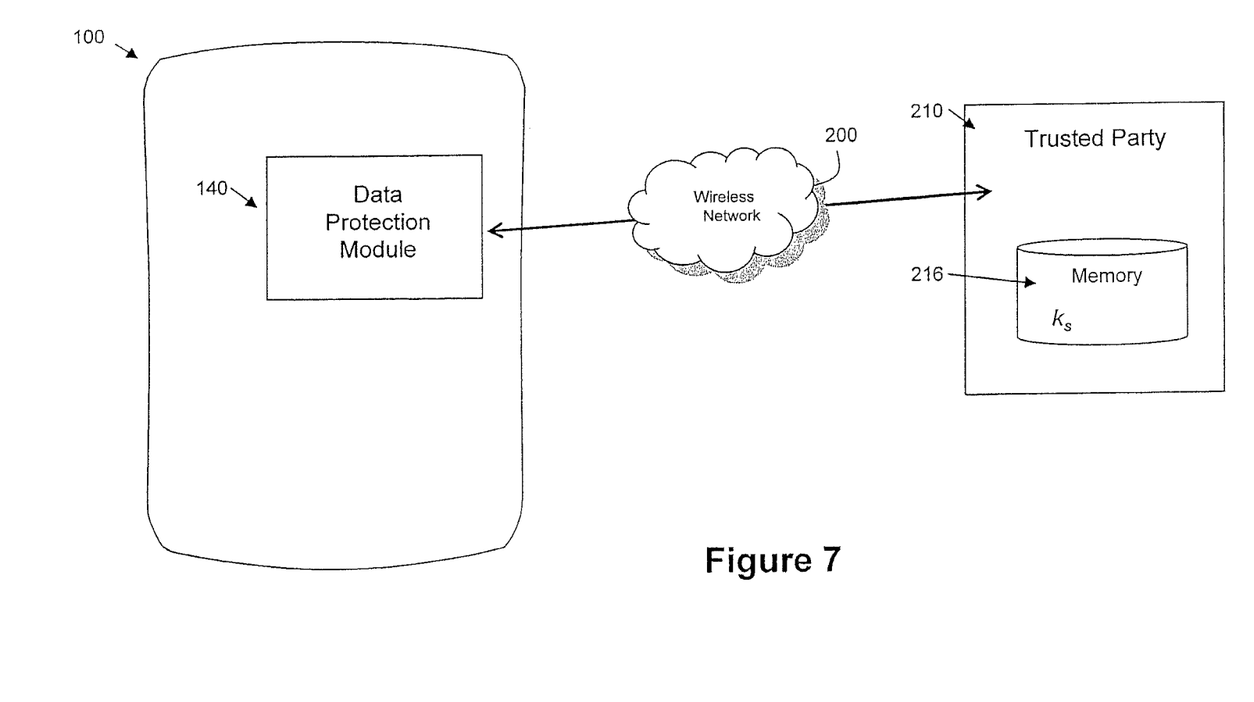
FIG. 7 is a schematic diagram illustrating another embodiment of system components for protecting data on a mobile device.

Turning therefore to FIG. 7, a mobile device 100 is shown having a Data Protection Module 140, which communicates with a trusted party 210 over a wireless network 200. The trusted party 210 has stored in its memory 216 a secret key $k_s$. The secret key $k_s$ is private to the trusted party 210 and is not known to the user.

Figure 8:
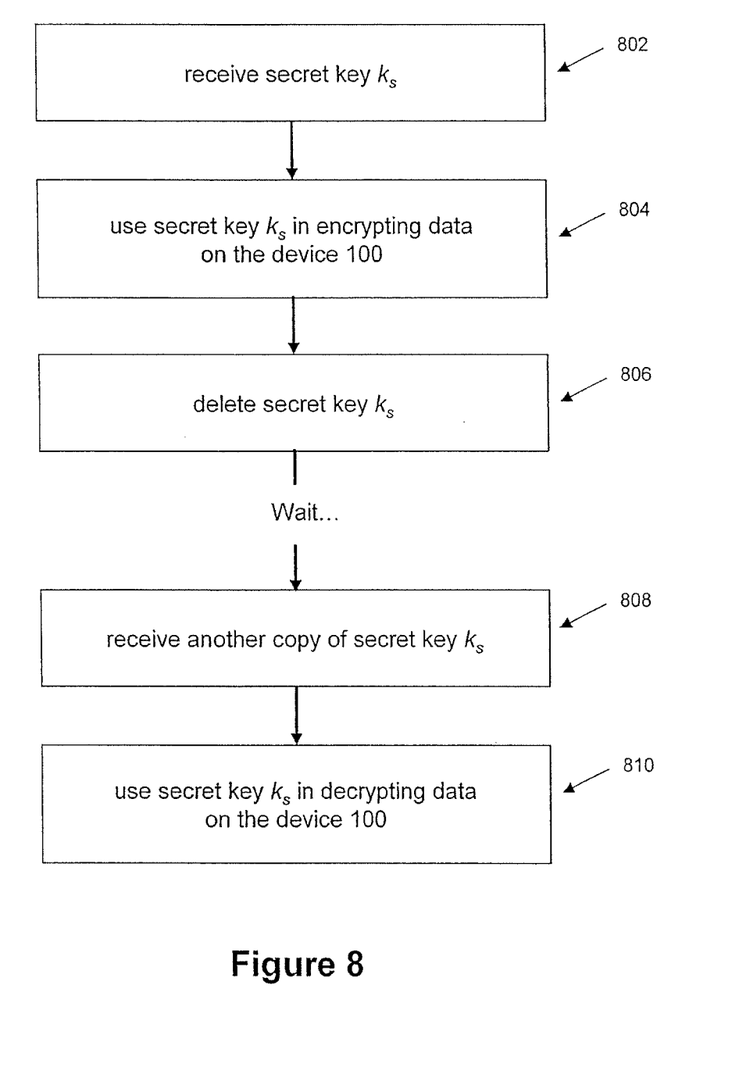
FIG. 8 is a schematic diagram of a set of computer executable instructions for another embodiment of a method of protecting data on a mobile device.

As the user carries the mobile device 100 during his or her travels, the mobile device 100 may be transported into an unsafe area in which there is a risk that an interloper could gain possession of the device 100 and extract sensitive information stored on the device 100. Therefore, as shown in FIG. 8, the Data Protection Module 140 advantageously provides enhanced protection of data stored on the mobile device 100 by using the secret key $k_s$ from the trusted party 210 in encrypting and decrypting the data. FIG. 8 can comprise a set of computer readable instructions stored on the mobile device 100 and executed by the Data Protection Module 140.

First, in step 802, the Data Protection Module 140 receives from the trusted party 210 a transmission over the wireless network 200 which includes the secret key $k_s$. The transmission may be made secure through encryption, or the channel itself may be secure, thereby rendering the transmission secure. If the channel cannot be made secure, the secret key $k_s$ can instead be sent as part of a message in plaintext, preferably using methods of hiding the key in the message, such as by spreading the key over a plurality of bytes that appear unrelated, but that are retrievable by the Data Protection Module 140. As explained earlier, the transmission of secret key $k_s$ in step 802 is initiated by a detectable event.

Next, in step 804, the Data Protection Module 140 uses the secret key $k_s$ in encrypting data on the device. For example, the secret key $k_s$ may be used directly as a symmetric key to encrypt data. Alternatively, as described earlier, the secret key $k_s$ may be combined with a data string in the memory of the device 100, or by secret information provided by the user (e.g. the user's secret password) to derive a new key, which is instead used to encrypt the data on the device 100. The advantage of combining the secret key $k_s$ with secret information provided by the user is that more robust protection is achieved since both the secret key $k_s$ and the user's secret information must be known to generate the new key.

The data encrypted can be, for example, one or more content protection keys used in encrypting sensitive information (as in the embodiments shown in FIGS. 3-6). Alternatively, the data could be the sensitive information itself, thereby bypassing the step of using a content protection key.

Next, in step 806, the secret key $k_s$ used in encrypting the data is deleted by the Data Protection Module 140. Any other key(s) derived using the secret key $k_s$ (e.g. the new key $k_{new}$) is/are also deleted, if applicable.

Upon the completion of step 806, the data stored on the device is encrypted in a manner such that it is not possible for an interloper to decrypt the data using the secret information known by the user. This is because the secret key $k_s$ has been used in encrypting the data. The secret key $k_s$ is unknown to the user and has been deleted from the temporary memory of the device 100.

In a preferred embodiment, the device 100 locks during and subsequent to step 806 to prevent access to applications on the device 100 by a user. The device locks in a modified manner such that it cannot be unlocked by a user, even if the user inputs the user's secret password. The display 28 informs the user that the device 100 is in this locked mode. While in the locked mode, it is contemplated that the user is still able to access certain basic applications on the device 100, e.g., the ability to send and receive telephone calls.

After a subsequent detectable event, in step 808, the Data Protection Module 140 receives from the trusted party 210 another transmission which includes another copy of the secret key $k_s$ from the memory 216 of the trusted party 210. It is contemplated that this detectable event corresponds to an indication that the device 100 has returned to an area safe from interlopers.

Then, in step 810, the Data Protection Module 140 uses the secret key $k_s$ in decrypting the data. As described earlier, the secret key $k_s$ may be combined with secret information provided by the user or by a data string stored in the memory of the device 100 to derive a new key. In an embodiment in which the device 100 is locked, the Data Protection Module 140 instructs the device 100 to enter into regular locked mode such that when the user inputs the user's secret password, the device 100 will unlock.

Using the above-described method, sensitive information stored on the device 100 can be protected from interlopers in situations in which the device 100 is being transported through a hostile area. The sensitive information is protected in a manner that prevents the interloper from being able to decrypt the sensitive information using information divulged by the user. Since the user does not possesses the secret key $k_s$, the interloper can never obtain the value of this key from the user. Advantageously, once the device 100 has left the hostile area, the sensitive information can be decrypted and again accessed by the user.

In a variation of the embodiment described with reference to FIGS. 7 and 8, the secret key $k_s$ is an asymmetric private key having a corresponding public key $K_s$. The public key $K_s$ is stored in memory on the device 100. For example, $K_s$ may have been previously loaded onto the device 100 or previously transmitted to the device 100 during operation. Therefore, in steps 802 and 804, instead of the Data Protection Module 140 receiving from the trusted party 210 the secret key $k_s$ and using this secret key in encrypting data on the device, the Data Protection Module 140 instead encrypts data on the device 100 using the public key $K_s$. The public key $K_s$ may encrypt the data directly or instead be combined with a data string in the memory of the device 100 or with secret information provided by the user (e.g. the user's secret password) to derive a new key, which is instead used to encrypt the data on the device 100. Subsequently, in step 808, the Data Protection Module 140 receives from the trusted party 210 the corresponding secret private key $k_s$, and uses the secret key $k_s$ in decrypting the data in step 810. This embodiment is particularly advantageous in applications in which the mobile device 100 is required to initiate the enhanced protection mode, but the mobile device 100 is unable to communicate with the trusted party 210, for example if a network connection has failed or is non-existent.

Although the invention has been described with reference to certain specific embodiments, various modifications thereof will be apparent to those skilled in the art without departing from the spirit and scope of the invention as identified in the claims appended hereto.

What is claimed is:

1. A method of protecting data on a mobile device, the method comprising:
   receiving a transmission including a secret key;
   combining the secret key with secret information to generate a new key;
   encrypting data on the mobile device using the new key;
   deleting the new key subsequent to encrypting the data;
   receiving another transmission including the secret key;
   combining the secret key and the secret information to regenerate the new key; and
   decrypting the encrypted data using the new key.

2. The method of claim 1, wherein the secret information is received at a user interface of the device.

3. The method of claim 2, wherein the secret information comprises a password.

4. The method of claim 1, wherein the secret information is stored on the mobile device.

5. The method of claim 1, wherein the transmission and the other transmission are both secure transmissions from a trusted party, wherein the data includes a content protection key used in encrypting and decrypting sensitive information on the mobile device, and wherein prior to encrypting the data, the content protection key is used in encrypting the sensitive information.

6. The method of claim 1, wherein subsequent to encrypting the data, the device is locked, and wherein the device is unlocked subsequent to the device receiving the secret information.

7. The method of claim 1, wherein the other transmission is received subsequent to an event detectable to the mobile device.

8. The method of claim 7, wherein the event detectable to the mobile device comprises any one or more of: expiry of a period of time; a change in location of the mobile device; loss or detection of a particular network; and a request from a trusted party.

9. The method of claim 1, wherein the mobile device receives at a user interface an indication of a period of time, and wherein prior to receiving the secret key, the device transmits a message to a trusted party requesting the secret key.

10. The method of claim 1, wherein receiving the secret key occurs subsequent to a trusted party receiving a message indicative of the mobile device being in a safe area, the message indicative of the mobile device being in a safe area comprises GPS data transmitted from the mobile device or a communication specifying that the mobile device is in a safe area.

11. A mobile device configured to:
    receive a transmission including a secret key;
    combine the secret key with secret information to generate a new key;
    encrypt data on the mobile device using the new key;
    delete the new key subsequent to encrypting the data;
    receive another transmission including the secret key;
    combine the secret key and the secret information to regenerate the new key; and
    decrypt the encrypted data using the new key.

12. The mobile device of claim 11, wherein the secret information is received at a user interface of the device.

13. The mobile device of claim 12, wherein the secret information comprises a password.

14. The mobile device of claim 11, wherein the secret information is stored on the mobile device.

15. The mobile device of claim 11, wherein the transmission and the other transmission are both secure transmissions from a trusted party, wherein the data includes a content protection key used in encrypting and decrypting sensitive information on the mobile device, and wherein prior to encrypting the data, the content protection key is used in encrypting the sensitive information.

16. The mobile device of claim 11, wherein subsequent to encrypting the data, the device is locked, and wherein the device is unlocked subsequent to the device receiving the secret information.

17. The mobile device of claim 11, wherein the other transmission is received subsequent to an event detectable to the mobile device.

18. The mobile device of claim 17, wherein the event detectable to the mobile device comprises any one or more of: expiry of a period of time; a change in location of the mobile device; loss or detection of a particular network; and a request from a trusted party.

19. The mobile device of claim 11, wherein the mobile device receives at a user interface an indication of a period of time, and wherein prior to receiving the secret key, the device transmits a message to a trusted party requesting the secret key.

20. The mobile device of claim 11, wherein receiving the secret key occurs subsequent to a trusted party receiving a message indicative of the mobile device being in a safe area, the message indicative of the mobile device being in a safe area comprises GPS data transmitted from the mobile device or a communication specifying that the mobile device is in a safe area.

21. A computer readable medium memory having stored thereon computer readable instructions executable on a mobile device, the computer readable instructions comprising instructions for:
  receiving a transmission including a secret key;
  combining the secret key with secret information to generate a new key;
  encrypting data on the mobile device using the new key;
  deleting the new key subsequent to encrypting the data;
  receiving another transmission including the secret key;
  combining the secret key and the secret information to regenerate the new key; and
  decrypting the encrypted data using the new key.

* * * * *